July 10, 1956     A. VON WANGENHEIM     2,754,062
BALANCED THERMOSTATIC VALVE
Filed Aug. 2, 1952
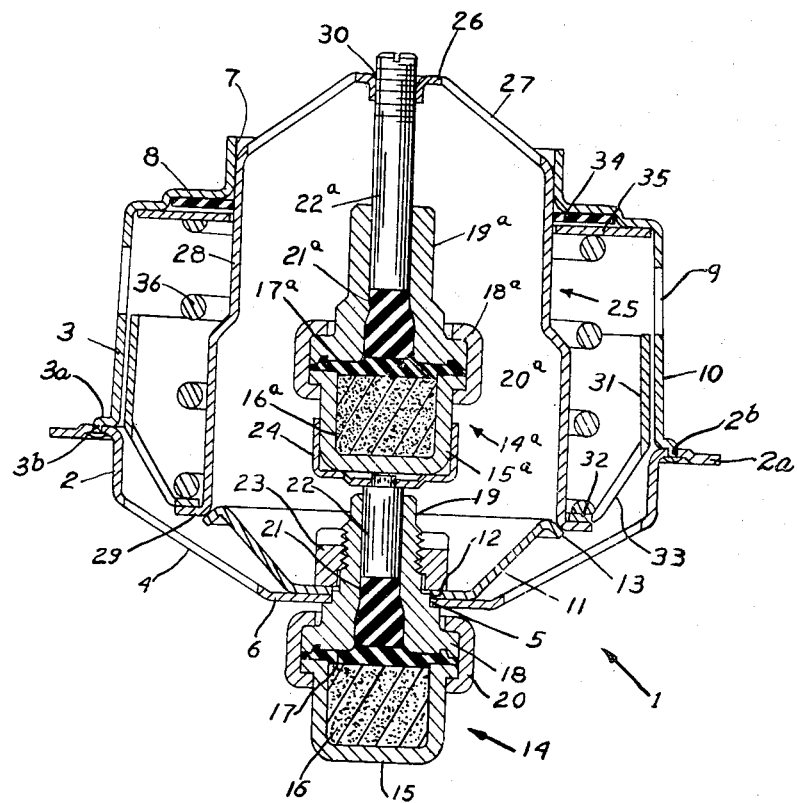
INVENTOR.
ADOLF VON WANGENHEIM
BY
Andrew K. Foulds
his ATTORNEY United States Patent Office 2,754,062
Patented July 10, 1956

2,754,062
BALANCED THERMOSTATIC VALVE

Adolf Von Wangenheim, Detroit, Mich., assignor to Detroit Controls Corporation, a corporation of Michigan Application August 2, 1952, Serial No. 302,391

10 Claims. (Cl. 236—34.5)

This invention relates to new and useful improvements in thermostatically operated valves and more particularly to a thermostatic valve of balanced construction. In the operation of automatically controlled valves and particularly thermostatic valves for controlling flow of a cooling medium, there frequently arises a problem of variations in operation due to the fluid pressure against which the valve must operate. An ideal thermostatic valve is one which is of balanced construction so that the valve responds only to temperature and is not affected by variations in pressure. The so-called "butterfly" type valve is the most common valve of balanced construction in general use but is subject to certain disadvantages.

It is, therefore, one object of this invention to provide a balanced type thermostatic valve of new and improved construction.

Another object of this invention is to provide a balanced thermostatic valve having a controlled by-pass.

Another object is to provide a thermostatic valve of new and improved construction which is inexpensive to manufacture and assemble and simple to operate.

Other objects will become apparent throughout the specification and claims as hereinafter related.

This invention comprises the new and improved construction and combination of parts which will be described more fully hereinafter and the novelty of which will be particularly pointed out and distinctly claimed.

In the accompanying drawing, to be taken as a part of this specification, there is clearly and fully illustrated a preferred embodiment of this invention in which drawing:

The figure shown is a longitudinal central sectional view of a thermostatic valve illustrating this invention.

Referring to the drawing by characters of reference, there is shown a thermostatic valve 1 comprising cup-shaped casing members 2 and 3. The cup shaped member 3 has a flanged end portion 3a and a plurality of downwardly extending arms 3b. The cup shaped member 2 has an outwardly extending flange 2a with a plurality of apertures 2b therethrough. The arms 3b extend through the apertures 2b and peripherally secure the cup shaped members 2 and 3 to form a tubular valve casing. The casing member 2 has a plurality of peripherally positioned inlet apertures 4 and a central aperture 5 in the end wall 6 thereof. The casing member 3 has a sleeved outlet aperture 7 of reduced diameter in the end wall 8 and has a plurality of by-pass port openings 9 in the side wall 10 thereof. On the inner side of the casing member 2, there is positioned a cup-shaped valve seat member 11 which has a central aperture 12 in its base registering with the aperture 5 in the end wall 6 of the casing member 2. The valve seat member 11 has a peripheral rolled flange 13 which provides a valve seat surface. On the outside of the casing member 2, there is positioned a thermostatic power element 14 which is known commercially as a "Vernatherm" or "Vernet" type power element. The power element 14 comprises a casing 15 enclosing a solid thermostatic material 16 which is expansible upon change of state and which operates against a diaphragm 17 closing the open end of the power element casing. The diaphragm 17 is secured peripherally in position by the flange 18 of the guide tube member 19. The flange 18 is secured in position by an annular clamping member 20 which is rolled into securing position. The diaphragm 17 operates against a rubber thrust transmitting plug 21 which in turn moves an operating piston or plunger 22. The guide tube member 19 extends through the registering apertures 5 and 12 and has a nut 23 threaded thereon to hold the power element 14, valve seat member 11, and casing member 2 rigidly together. The operating plunger 22 carries a cup-shaped supporting member 24 on its outer end portion which supports a second thermostatic power element 14a. The power element 14a is identical in construction with the power element 14 and corresponding parts thereof are given the same reference numerals with the suffix "a" added thereto. Within the valve casing there is positioned a cup-shaped valve member 25 which has an end wall 26 with outlet apertures 27 therein. The valve member 25 has a side wall portion 28 of slightly reduced diameter which is reciprocally guided in the sleeved outlet opening 7. The valve member 25 has a flanged open end portion 29 which cooperates with the valve seat flanged surface 13 to close off flow through the valve. The second power element plunger 22a is threadedly connected as at 30 in the end wall 26 of the valve member 25 for movement of the same to open and closed position. There is an annular sleeve member 31 which has an inturned flange 32 seated on the flanged end 29 of the valve member 25 and which could, if desired, be formed integrally therewith. The sleeve member 31 has a plurality of apertures 33 which permit flow to the by-pass apertures 9 when the valve is closed. At the outlet end of the valve, there is positioned an annular washer 34 which is preferably of a resilient rubber-like material to prevent leakage around the valve member 25. An annular metal washer member 35 is positioned in overlying relation to the rubber washer 34 and receives and supports one end of a spring 36, the other end of which seats on the flanges 32 and 29 and urges the valve member 25 toward closed position.

*Operation*

In operation, this valve is designed to control the flow of cooling water in the cooling system for an internal combustion engine. In such a cooling system the water line thermostat is connected to control flow of cooling water through the radiator of the engine and has a normally open by-pass to permit continued flow of water over the thermostatic element of the valve. When the valve is closed, the water normally enters through the inlet apertures 4 and flows through the apertures 33 in the sleeve member 31 and out through the by-pass ports 9. When the valve is closed, this flow of water passes only the outer thermostatic element 14. When the power element 14 is heated slightly, the operating plunger 22 moves outward and thus moves the valve member 25 toward open position. When the valve is slightly open, then the flow of water will be at least partially through the open valve and out through the outlet apertures 27 in the valve member 25. This water flow passes both of the thermostatic power elements and thus they both respond to open the valve further and more rapidly. Due to the cylindrical construction of the valve member 25, there is practically no pressure tending to hold the valve closed other than the force asserted by the valve closing spring 36. This construction provides a valve which is substantially balanced in operation and thus will not vary in its operation with variations in the pressure against which it must operate. The sleeve member 31 which is movable with the valve member 25 is operable to close off the by-pass ports 9 when the valve member 25 is moved to a fully opened position. In such a position, this valve will direct all of the cooling liquid through the outlet apertures 27 and substantially prevent flow through the by-pass.

Although there has been illustrated only one preferred embodiment of this invention, it will be obvious to those skilled in the art that other modifications are possible without departing from the scope and intent of this invention which is to be limited only by the appended claims.

Having thus described the invention, what is claimed and is desired to be secured by Letters Patent of the United States is:

1. In a thermostatic valve, a casing having an end wall with a sleeved outlet opening of reduced diameter therethrough, a supporting means carried transversely by said casing, an annular valve seat member carried by said supporting means, means having a portion radially outward of said valve seat member with a flow inlet opening therethrough, a tubular valve member reciprocally guided in said outlet opening and positioned within said casing and movable longitudinally toward and away from said valve seat member for controlling flow of fluid entering said casing through said flow inlet opening and flowing into said tubular valve member, means for discharging fluid from the interior of said tubular valve member, said casing having in its side wall a normally open outlet port adjacent said end wall for the flow of fluid in bypass relation to said tubular valve member, an annular sleeve member laterally spaced from and surrounding said tubular valve member for flow of liquid between said valve member and said sleeve member, said annular sleeve member being carried by said valve member and cooperable with said outlet port to close the same upon tubular valve member opening movement, and thermostatic means for moving said tubular valve member.

2. In a thermostatic valve, a tubular valve casing, an end wall in said casing having a sleeved opening of reduced diameter therein, a valve seat member secured in said casing opposite said opening, a tubular valve member normally closed against said valve seat member and guided for reciprocal movement in said sleeved opening, a first thermostatic power element secured exteriorly on said casing and having an operating plunger opening through said casing, said operating plunger being reciprocally movable in said valve member, a second thermostatic power element positioned within said tubular valve member and carried on said operating plunger and operatively connected to said valve member, and said power elements cooperating to move said valve member to open position upon increasing temperature.

3. In a thermostatic valve, a casing having an end wall with inflow openings therethrough, a valve seat member within said casing and supported on said end wall, said end wall and said seat member having alined apertures therethrough, thermostatic means having a housing extending through said apertures and abutting said end wall, means clamping said valve seat member and said housing to said end wall, a tubular valve member reciprocal in said casing and engageable with said seat member, and a plunger extending from said housing and operatively connected to said tubular valve member.

4. In a thermostatic valve, a casing, a supporting means carried trnasversely by said casing, said supporting means having an annular valve seat portion and having a portion radially outward of said valve seat portion with a fluid flow opening therethrough, said supporting means having an aperture concentric with said valve seat portion, a tubular valve member positioned within said casing and movable longitudinally toward and away from said valve seat portion for controlling flow of fluid from said opening into said tubular valve member, means for discharging fluid from the interior of said tubular valve, said casing having an outlet port for the flow of fluid in bypass relation to said tubular valve member, a first thermostatic power element secured exteriorly of said valve casing and on said supporting means and having an operating plunger positioned in said supporting means aperture and reciprocally movable in said tubular valve member, a second thermostatic power element positioned within said tubular valve member and carried on said operating plunger and operatively connected to said valve member, and said power elements cooperating to move said valve member to open position upon increasing temperature.

5. In a thermostatic valve, a tubular valve casing, an end wall in said casing having a sleeved opening of reduced diameter therein, a valve seat member secured in said casing opposite said opening, a tubular valve member normally closed against said valve seat member and guided for reciprocal movement in said sleeved opening, said casing having a normally open by-pass port, said valve member having an annular sleeve portion cooperable with said by-pass port to close the same upon valve member opening movement, a first thermostatic power element secured exteriorly on said casing and having an operating plunger opening through said casing, said operating plunger being reciprocally movable in said valve member, a second thermosttaic power element positioned within said tubular valve member and carried on said operating plunger and operatively connected to said valve member, and said power elements cooperating to move said valve member to open position upon increasing temperature.

6. In a thermostatic valve, a tubular casing having end walls, one of said end walls having a sleeved outlet opening of reduced diameter therein, the other end wall having an inlet opening therein, a valve seat member secured to said other end wall opposite said sleeved outlet opening, a cup-shaped valve member having an apertured base portion guided in said sleeved outlet opening, said valve member having a flanged open end cooperable with said valve seat member to close off flow through said casing, a spring positioned between said one casing end wall and said valve member flanged end to urge the same toward closed position, said other end wall and said valve seat member having aligned central apertures, and a thermostatic power element positioned exterior to said casing and having an operating plunger extending through said aligned apertures into cooperating engagement with the base portion of said valve member for moving the same to open and closed positions.

7. In a thermostatic valve, a tubular casing having end walls, one of said end walls having a sleeved outlet opening of reduced diameter therein, the other end wall having an inlet opening therein, a valve seat member secured to said other end wall opposite said sleeved outlet opening, a cup-shaped valve member having an apertured base portion guided in said sleeved outlet opening, said valve member having a flanged open end cooperable with said valve seat member to close off flow through said casing, a spring positioned between said one casing end wall and said valve member flanged end to urge the same toward closed position, said casing having a normally open by-pass port in the side wall thereof, said valve member flanged end having an annular sleeve portion cooperable with said by-pass port to close the same upon valve member opening movement, said other end wall and said valve seat member having aligned central apertures, and a thermostatic power element positioned exterior to said casing and having an operating plunger extending through said aligned apertures into cooperating engagement with the base portion of said valve member for moving the same to open and closed positions.

8. In a thermostatic valve, a tubular casing having end walls, one of said end walls having a sleeved outlet opening of reduced diameter therethrough, the other end wall comprising a supporting means having a central aperture, an annular valve seat portion and having a portion radially outward of said valve seat portion with a fluid flow opening therethrough, a cup shaped valve member having an apertured end wall portion guided in said sleeved outlet opening, said valve member having a flanged open end portion cooperable with said valve seat portion to close off flow through said casing, a spring positioned between said one casing end wall and said valve member flanged end portion to urge the same toward closed position, said casing having a normally open bypass port in the side wall thereof, said valve member flanged end portion having an annular sleeve portion cooperable with said bypass port to close the same upon valve member opening movement, and a thermostatic power element positioned exterior to said supporting means and having an operating plunger extending through said central aperture into co-operating engagement with said end wall portion of said valve member for moving the same to open and closed positions.

9. In a thermostatic valve, first and second cup-shaped casing members peripherally joined to form a tubular valve casing, the first of said casing members having a sleeved outlet opening of reduced diameter in the end wall and a by-pass port in the side wall thereof, the second of said casing members having peripherally spaced inlet openings and a central aperture, a cup-shaped valve seat member secured on the end wall of said second casing member and having a central aperture registering with said first-named central aperture, said valve seat member having a peripheral rolled flange providing a valve seat surface, a first thermostatic expansive power element positioned exterior to said casing and having a guide tube and operating plunger extending through said aligned apertures; means securing said power element, said valve seat member, and said second casing member together, a cup-shaped valve member having an apertured base and a flanged open end providing a valve surface, said valve member having its base portion guided in said sleeved outlet opening and said valve surface engageable to close against said valve seat surface, said valve member flanged end having an annular sleeve portion movable to close said by-pass port upon valve opening movement, a spring positioned between said first casing end wall and said valve member flanged end to urge the same to closed position, a second thermostatic expansive power element carried by said first power element plunger and having an operating plunger operatively connected to the end wall of said valve member for movement thereof, and said first power element being operable to respond to temperature of a fluid flowing through said by-pass port, and said first and second power elements being operable to respond jointly to temperature of a fluid flowing through the valve member after said valve member is opened.

10. In a thermostatic valve, first and second cup-shaped casing members, said first casing member having an outwardly extending end portion and a plurality of downwardly extending arms secured to said end portion, said second cup-shape member having an outwardly extending flanged end portion with a plurality of apertures therethrough, said arms extending through said apertures in said second cup-shaped casing member flanged portion and joining said casing members to form a tubular valve casing, said first casing member having a sleeved outlet opening of reduced diameter in its end wall and a plurality of aligned bypass ports positioned in a substantially common plane in the side wall thereof, said second casing member having a plurality of peripherally spaced inlet openings and a central aperture positioned in its end wall, a cup-shaped valve member positioned within said second casing member and having a central aperture aligned with said central aperture in said second casing member, said valve seat member having a peripheral rebent flange providing a valve seat surface; a first thermostatic expansive power element having a cup-shaped casing with a flanged end portion, a solid thermostatically expansive material substantially filling said casing, a resilient disc type diaphragm positioned on said flanged end portion and sealing said cup-shaped casing, a guide tube having a flanged base portion and a threaded body portion, said diaphragm being secured peripherally by said guide tube flange portion, an annular clamping member securing said casing flange portion and said guide tube flanged base portion, a resilient thrust member positioned in the lower portion of said guide tube and an operating piston positioned in said upper portion of said guide tube in operative relation with said resilient thrust member, said operating piston terminating in a portion of reduced diameter exteriorly of said guide tube body portion, said guide tube and operating piston extending through said aligned apertures in said valve seat member and said second casing; a nut threaded on said guide tube body portion and securing said power element, said valve seat member and said second casing member together, a cup-shaped valve member having an end wall and a flanged open end portion providing a valve surface, said valve member end wall having a plurality of outlet openings positioned on its outer periphery and a centrally positioned internally threaded sleeve portion, said valve member being guided in said sleeved outlet opening in said first cup-shaped casing member and said valve surface being engageable to close against said valve seat surface, said valve member thus forming an annular passage within said valve casing, an annular sleeve member having an inturned flange portion and a plurality of apertures peripherally spaced on said flange portion, said sleeve member being positioned within said casing and secured to said valve member flanged portion, said sleeve member being movable to close said bypass port upon valve member opening movement, a gasket type washer positioned around said valve member and adjacent to said end wall of said first casing member to prevent leakage of fluid through the clearance between said first casing member end wall sleeved outlet opening and said valve member, a washer positioned around said valve member adjacent to said gasket type washer, a spring positioned between said last named washer and said annular sleeve member to urge said valve member to closed position, a cup-shaped guide member having a centrally positioned aperture in its base portion, said cup-shaped guide member being positioned within said valve member and with said end portion of said first named thermostatic element operating piston extending through said last named aperture; a second thermostatic expansive element having a cup-shaped casing with a flanged end portion, a solid thermostatic expansive material substantially filling said casing, a resilient disc type diaphragm positioned on said flanged end portion and sealing said cup-shaped casing, a guide tube having a flanged base portion and a body portion, said diaphragm being secured peripherally by said guide tube flanged portion, an annular clamping member securing said casing flange portion and said guide tube flange portion, a resilient thrust member positioned in the lower portion of said guide tube and an operating piston having a threaded end portion positioned in the upper portion of said guide tube with said threaded end portion being positioned exteriorly of said guide tube body portion, and said operating piston being in operative relation with said resilient thrust member; said second thermostatic element cup-shaped casing being positioned within said cup-shaped guide member and said opreating piston of said second thermostatic element being threadely secured in said valve member sleeve portion, said operating piston being positioned to move said valve member, and said first power element being operable to respond to temperature of fluid flowing through said annular passage between said valve member and said tubular valve casing when said valve member is in a closed position, said first and second power elements being operable to respond jointly to temperature of a fluid flowing through said valve member when said valve member is in open position.

References Cited in the file of this patent

UNITED STATES PATENTS

| | | |
|---|---|---|
| 1,000,435 | Pagelsen | Aug. 15, 1911 |
| 1,639,299 | Kinnard | Aug. 16, 1927 |
| 1,940,090 | Ketherington | Dec. 19, 1933 |
| 2,174,042 | Rose | Sept. 26, 1939 |
| 2,470,667 | Warrick | May 17, 1949 |

FOREIGN PATENTS

| | | |
|---|---|---|
| 419,023 | Germany | Sept. 26, 1925 |
| 662,977 | Germany | July 26, 1938 |